Sept. 29, 1925.  
D. E. LUTZ  
1,555,472  
BODY HEATING APPLIANCE  
Filed March 29, 1922
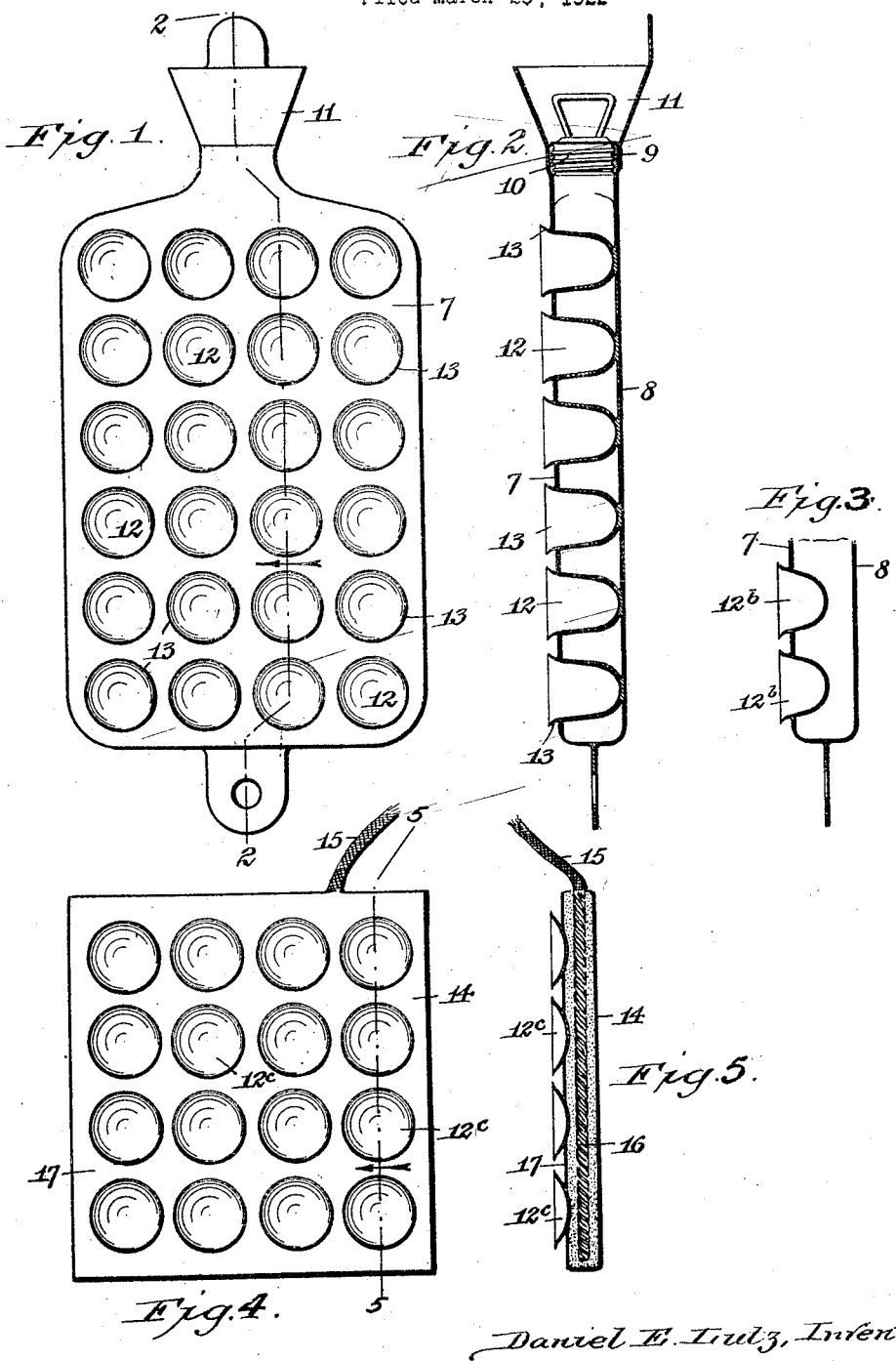
Daniel E. Lutz, Inventor.  
By Emil Kunhart  
Attorney.

Patented Sept. 29, 1925.

1,555,472

UNITED STATES PATENT OFFICE.

DANIEL E. LUTZ, OF BUFFALO, NEW YORK.

BODY-HEATING APPLIANCE.

Application filed March 29, 1922. Serial No. 547,657.

*To all whom it may concern:*

Be it known that I, DANIEL E. LUTZ, a citizen of the United States, residing at Buffalo, in the county of Erie and State of New York, have invented certain new and useful Improvements in Body-Heating Appliances, of which the following is a specification.

My invention relates to body heating appliances, such as hot water bottles, pads or jackets, or electrically heated pads and the like.

The primary object of my invention is the provision of a body heating appliance in which in addition to heating the parts of a body where such an appliance is applied, dry cupping also takes place.

Another object of my invention is to provide a body heating appliance with suction cups heated from the interior of the appliance, and creating a partial vacuum within the cups to excite action in the part of the body covered by the appliance.

The present method of cupping as practiced by physicians consists in putting a few drops of alcohol into a teacup or other cup-like device, lighting the alcohol and immediately after the alcohol has been consumed, pressing the open end of the cup against that part of the body of the individual to be treated. As the oxygen within the cup has been consumed by the burning of the alcohol, a partial vacuum is formed; but this method confines the limits of application to the small area covered by the cup and as the cup soon cools, the benefit of the heat is quickly lost.

Another object of my invention is that of providing a heating appliance with suction cups covering a considerable area of the body and heating the exterior of said cups for an indefinite period of time.

A further object of my invention is to provide a heating appliance of the kind described in which the rims of the vacuum cups are flexible so that by pressing the same against the body, the air within will be extruded and a partial vacuum formed to which continuous heat is applied.

The invention consists in equipping a body heating appliance with a vacuum cup or cups subjected to heat externally.

It also consists in the method of creating a partial vacuum and retaining the vacuum under heat, which acts on the body to draw away from the parts affected or treated, any congested blood, poisonous gases, fluids, or other morbid matter, and expels them through the skin, thereby relieving the pain or congestion.

It further consists in the novel features of construction and in the arrangement and combination of parts to be hereinafter described and more particularly pointed out in the subjoined claims.

In the drawings:—

Fig. 1 is a front elevation of a hot water bottle constructed in accordance with my invention.

Fig. 2 is a longitudinal section taken on line 2—2, Fig. 1, looking in the direction of the arrow crossing said line.

Fig. 3 is a similar section showing a still further modified form of my invention.

Fig. 4 is a front elevation of an electrically heated pad or appliance constructed in accordance with my invention.

Fig. 5 is a section taken on line 5—5, Fig. 4, looking in the direction of the arrow crossing said line.

The benefits to be derived from cupping according to my method, as carried out with my improved heating appliance, are that it assures a thorough heating of the part or parts of the body affected, by the use of hot water, electric current, or other heating medium, thereby causing an expansion of the muscles and tissues in which the contusion or congestion is located.

It also causes a partial vacuum and draws to the surface all morbid matter, expelling such matter out through the skin, which is highly desirable and at times necessary in various ailments and illnesses, such as in cases of pneumonia, inflammation of the tissues and muscles, muscular rheumatism, or any disease where congestion is the factor in producing a diseased condition.

In Figs. 1 and 2 of the drawing I have shown a heating appliance in the form of a hot water bottle having the usual spaced walls 7, 8, connected at the sides, top, and bottom to form a container for hot water and provided at the top with a filling opening 9 closed by a screw plug or other closure 10 introduced into a funnel-like receiver or neck 11.

12 designates vacuum cups, which are arranged to extend from one wall to and beyond the other, these cups serving to hold the walls 7, 8 in spaced relation and thus prevent collapse of the bottle. The walls of the cups within the bottle may be of any desired thickness, preferably that of the walls of the bottle, but the projecting portions, designated by the numeral 13, are made comparatively thin, the preferred construction being to feather them from the wall of the bottle outwardly toward their edges. These projecting portions of the cups are therefore very flexible and after filling the bottle with hot water, it may be applied to the portion of the body affected, and when pressing the bottle against the body, the feathered edges of the cups will snugly hug the body, and during the act of applying pressure thereto the air within the cups will be extruded, with the result that a partial vacuum is formed in each of the cups, which serves to create suction and cause the free edges of the cups to adhere to the body. The partial vacuum within the cups, and the free edges of the cups, as well as the adjacent wall of the bottle, are thoroughly heated by the hot water within the bottle, and such portions of the wall of the bottle that do not lie in contact with the body will radiate heat, which is carried against the body and assists in relieving pain and congestion. The functioning of the cups is that known as dry cupping, which excites action in the parts affected, with the result that congested blood, poisonous gases or fluids and other morbid matter are extracted through the skin, thereby relieving the body of all pains and congestion.

The advantages of a cupped contact surface over a heating appliance having a smooth contact surface are therefore clearly apparent, and in my invention I wish to particularly distinguish from the ordinary mode of cupping in that the cups are externally heated and the heat retained for a long period of time, if not indefinitely. In the case of a cup whose walls are heated to the desired degree and then permitted to cool, the cupping action takes place only so long as the walls of the cup retain the heat, which quickly becomes diminished as the heat passes from the walls.

In the modification shown in Fig. 4, the cups designated by the numeral 12$^b$ are supported solely by one of the walls of the bottle and they extend into the interior of the bottle and also project from said wall. The cups are more shallow than those shown in the construction provided for in Fig. 2.

In the modification shown in Figs. 5 and 6, the vacuum cups designated by the numeral 12$^c$ are applied to an electric pad 14 which may be of the usual construction having the current conducting wires 15 leading into or connected with resistance wires or coils 16 within the pad, the pad being provided with facing material 17, preferably rubber, which has the vacuum cups 12$^c$ extending slightly into the pad and the feathered edges or rims of said cups projecting from the face of the pad.

In all these constructions shown in the drawings, the cups are vulcanized or otherwise formed onto or into the walls of the bag, container, or pad, as the case may be.

While I have shown my invention applied to a hot water bag and an electric pad, it is apparent that it may be utilized in other forms, so long as a proper foundation or heating or heated support is provided for the vacuum cups.

It is also to be understood that, under the principle involved, it is immaterial whether or not a single vacuum cup or a plurality of cups are employed, since for certain purposes a single vacuum cup of greater diameter than those shown in the drawings could also be used, suitable exterior means being of course provided to heat the cup and to keep the interior, as well as the wall of the cup, heated for an indefinite period.

Having thus described my invention, what I claim is:—

1. A body heating appliance comprising two spaced walls, and a series of vacuum cups extending through one of said walls.

2. A body heating appliance comprising two spaced walls, and a series of vacuum cups extending into the space between said walls and having their edge portions extending outwardly from the exterior of one of said walls.

3. A body heating appliance comprising a body portion having two spaced walls, a series of vacuum cups vulcanized to the interior of one of said walls and extending out through the other wall, each of said vacuum cups having the outwardly extending portion of its wall gradually reduced in thickness toward its outer edge.

4. A body heating appliance comprising a body portion having two spaced walls, and vacuum cups carried by one of said walls and extending inwardly and outwardly therefrom.

5. A body heating appliance having a hot water space, and a series of vacuum cups arranged with the contact edges of said cups projecting beyond the surface of said appliance and portions of said cups extending into said hot water space.

In testimony whereof I affix my signature.

DANIEL E. LUTZ.